United States Patent Office 3,025,159
Patented Mar. 13, 1962

3,025,159
SELF-CURING ANILINE-FORMALDEHYDE RESIN BINDER COMPOSITION AND METHOD OF PREPARATION
Carl V. Brouillette, Port Hueneme, and William M. Foley, Jr., Berkeley, Calif., and Herbert McKennis, Jr., Richmond, Va., assignors to the United States of America as represented by the Secretary of the Navy
No Drawing. Filed Mar. 24, 1959, Ser. No. 801,671
4 Claims. (Cl. 94—19)
(Granted under Title 35, U.S. Code (1952), sec. 266)

The invention described herein may be manufactured and used by or for the Government of the United States of America for governmental purposes without the payment of any royalties thereon or therefor.

This invention relates to a self-curing cementitious composition comprising an aggregate or filler and a resinous cement and to the process of making, using, and applying such composition in surfacing roadways or manufacturing certain structural components.

This application is a continuation-in-part of our copending application, Serial No. 545,142, filed November 4, 1955, now abandoned, and entitled "Resinous Concrete and Process for Making Same."

Recognizing the need, as a result of the increased amphibious operations of World War II, the Navy instituted an accelerated program for the investigation and development of methods of rapidly stabilizing beach sand to form roadways for the passage of the wheeled traffic of an amphibious landing group as well as the rapid surfacing of airfields constructed by such groups. Knowing of the work of Dr. Hans Winterkorn, as exemplified by his patent No. 2,314,181, this eminent authority was called as a consultant to the Bureau of Yards and Docks, Navy Department, and to the Naval Civil Engineering Research and Evaluation Laboratory.

It was soon ascertained that while the basic aniline-furfural formulation held forth the most promise, its combination with a bituminous composition resulted in a binder that was too slow in hardening sufficiently to bear wheeled traffic and had other defects. The hardening of these compounds was a matter of days rather than the desired matter of minutes or hours.

It then developed that the reaction of the aniline-furfural combination may be hastened by employing an acid catalyst. If too much or too strong an acid is used, however, the product tends to be crystalline and extremely brittle. Further, careful apportionment is essential, since an excess of either aniline or furfural softens the resin. Many acid catalysts were tried including acid forming substances such as ferric and aluminum chlorides.

In the basic reaction of aniline and furfural, the formation of a trimer results in the binder or cement which is able to stabilize sand or other aggregate. By the use of critical proportions of certain aromatic amino compounds or dianils as additives to the aniline and critical proportions of certain organic polybasic weak acids, it was found that polymerization proceeds beyond the trimer stage so that substances of a very high molecular weight can be expected soon after the roadway surfacing composition has been laid or after our composition has been added to the aggregate for forming structural components. To understand the advantages of these high molecular weight substances, the analogous example of isoprene may be cited. Under ordinary circumstances, isoprene, the building block of rubber, in itself, possesses little or no adhesive and elastic qualities, but when a sufficient number of isoprene units have combined properly with each other to form a chain, a substance is obtained with both adhesive and elastic properties. So here, the trimers formed in the basic reaction of aniline-furfural have been caused to polymerize further by our invention to result in a new binder or cementitious resinous composition or cement which has greatly improved qualities of adhesiveness, elasticity, and quick hearedenability.

In several amphibious training exercises, approximately 2500 linear feet of roadway 12 feet wide were constructed experimentally using our new formulation. These strips varied in thickness from 4 to 8 inches; a thickness of approximately 6 inches being found preferable.

A commercially available Model 54 Wood Roadmixer drawn by a tractor was used in the stabilization experiments mentioned above. This machine has forward wings which pick up the sand or other aggregate and carry it into a pugmill where it is mixed with the chemicals sprayed through two nozzles located at the top of the pugmill. The mixed material passes from the pugmill into a double helix spreader. The mix as laid on the roadway bed then passes under a vibrating densifier or compacter which leaves a smooth, compacted surface. In general, a satisfactory setting time of one to two hours was achieved in the three experimental constructions. However, light military traffic has been borne within less than one-half hour after laying.

In the initial stages of development, the various roadway surfacing compositions comprised mixtures of pitch, aniline, furfural or other aldehydes, strong acids, acid salts and other relatively insoluble catalysts. When these formulations were processed with beach sand, the resulting roadway required a setting or curing time in excess of 18–24 hours. Other initial formulations contained dry materials which needed to be spread across the beach sand ahead of the stabilization equipment. Other chemicals were more or less in suspension in the liquid portions of the composition. A considerable quantity of heat was required to maintain a completely fluid mix. Amphibious landing exercises demonstrated the need for a completely liquid, resinous composition free of suspended chemicals, with such desirable features as increased polymerization, faster set, and greater effectiveness in wet sand or aggregate.

The object of this invention, therefore, is to provide a modified aniline-furfural cementitious composition which is completely liquid, which may be used under wide variations of ambient temperatures, and which, when used with sand or other aggregate, provides a roadway surfacing composition or other structural component which is capable of rapid and effective self-curing or stabilization to produce a strong and serviceable roadway or other structural component within a comparatively short period of time.

For the purposes of the continuing description of our invention, the term "aggregate" shall be interpreted as meaning any of a wide variety of filler materials to be used with our liquid chemicals, such filler materials to include wet or dry sands, soils, adobe, gravel, clay, loam, dust, shale, peat, sawdust, vermiculite, volcanic ash, lava, other mineral or organic fillers, rubble, crushed and broken concrete, or various mixtures thereof.

In order to disclose more clearly how the present invention may be carried out, specific examples will now be given. It should be understood, however, that this is done solely for the purposes of illustrating the principles of the invention and not for purposes of limitation thereof.

*Example I*

A mixture of eight parts by weight of aniline, two parts by weight of m-phenylene-diamine, three parts by weight of citric acid, five parts by weight of furfural and 300 parts by weight of sand was mixed and compacted. The material set at room temperature to a hard mass with unconfined bearing strength of 700 pounds per square inch in two and three-fourths hours.

Various mixes were made following the procedures set forth in this example but the practical and useful limits of the ingredients were found to be as follows:

| | Parts by weight |
|---|---|
| Aniline | 6 to 10 |
| M-phenylenediamine | 0.5 to 4 |
| Citric acid | 2 to 5 |
| Furfural | 4 to 7 |

Instead of citric acid, almost any polybasic weak organic acid may be used; its purpose being to accelerate the setting of the mixture, i.e., the formation of the resin polymer from the reaction of the aniline-furfural-diamine composition. Increasing the proportion of the weak organic acid, or the use of a strong inorganic acid or salts of a strong inorganic acid, tends to increase the brittleness of the product. While various monobasic organic acids were tried, they were found too strongly acidic in their catalytic reaction which resulted in an unsatisfactory degree of brittleness in the final product. By reducing the amount of the added aromatic diamine, a slow setting mass is obtained which renders the composition less serviceable. By increasing the amount of aromatic diamine, to proportions within the limits set forth above, the chain length and elastic nature of the product is improved. The aromatic polyamine, in which two or more amino groups are attached to one benzene or other aromatic nucleus as a group, have been found to be capable of entering into a reaction with furfural and may thus be employed.

Example II

A mixture of 7 parts by weight of aniline, two parts by weight of p-phenylenediamine, three parts by weight of maleic acid and five parts by weight of furfural was mixed thoroughly with 300 parts by weight of beach sand and compacted by means of a tamper. Within two hours, the resultant mass had a bearing strength (unconfined compression) of 800 to 1000 p.s.i., sufficient for the passage of vehicular or pedestrian traffic.

Example III

The ingredients in proportions similar to those in Examples I and II were mixed stepwise. The aromatic amines and the furfural were combined in the absence of the weak acid catalyst. An azomethine or anil was formed. The azomethine and excess aromatic amines were then caused to enter into further reaction with the formation of resin by the addition of the acid catalyst. The resultant resin had a quality similar to that formed in Example II, but the rate of formation is slower unless heat is added to compensate for the heat lost during the formation of the azomethine in the first step.

The process of resin formation may be more clearly understood by the following structural formulation which we believe to be correct and found to be useful in guiding the production of resin with desired quantities and in controlling the rate of set:

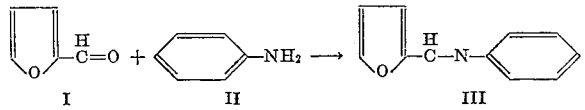

If aniline in the above reaction is replaced by toluidine, nitro-aniline, or other substituted aniline with alkyl group, halogen, or nitro group, the resultant azomethine is similar to III. A difunctional amine, such as phenylenediamine, reacts, when introduced into the aniline-furfural composition, to yield a more complex azomethine or dianil:

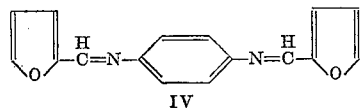

o-, p- and m-Phenylenediamine were used within the proportional limits set forth in Examples I and II above with satisfactory results. However, as the ortho compound is less soluble under ambient conditions and the para compound is inclined to be unstable in the free state, the meta compound was found most adaptable to our purposes.

Either of the above mentioned azomethines reacts further with aromatic amines in the presence of an acid catalyst to provide complex amino derivatives or dianils of 2-hydroxy-glutaconaldehyde with resultant cleavage of the furan ring.

In the presence of stoichiometric amounts of acid, crystalline compounds result as described by Stenhouse, Annalen der Chemie, 156, 197 (1870); Foley, Sanford and McKennis, "The Mechanism of the Reaction of Aniline with Furfural in the Presence of Acid," Journal, American Chemical Society 74, 5489 (1952); and Brouillette, Foley, and McKennis, "Use of the Stenhouse Reaction for the Preparation of Mixed Dianils of 2-Hydroxyglutaconaldehydes," Journal, American Chemical Society 76, 4617 (1954). The amount of acid is accordingly strictly limited to produce a catalytic effect only. By operating with stoichiometric amounts of amine and furfural and limiting the amount of the acid used to produce a catalytic effect only, resins of satisfactory quality for the purpose of our invention are achieved. With somewhat greater amounts than the stoichiometric of furfural, a resin of greater strength is produced. When sand is used to provide our surfacing composition, an excess of furfural up to 10% may be utilized for best results.

The effect of the added furfural in probably increasing polymerization may be more readily understood by the following reaction scheme:

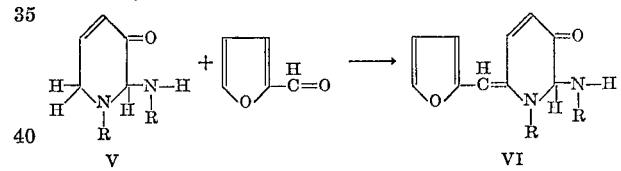

Where compound V contains R groups which are aromatic in nature and Compound VI represents a furfurylidene derivative with the furan ring capable of undergoing further reaction with aromatic amines.

Example IV

Aniline, eight parts by weight; furfural, five parts by weight; diglycollic acid, three parts by weight; and m-phenylenediamine, two parts by weight were mixed with sawdust, three hundred parts by weight. The mass was then cured for two hours at ambient temperatures and trimmed to a convenient size, as desired, by sawing to form structural blocks. Compaction at ambient temperatures may be utilized to increase the density of the mass. It has also been found by experiment that an increase in strength of the product may be accomplished by increasing of the ratio of chemicals to filler up to 1:10 instead of the ratio of 1:16⅔ set forth above.

Various other fillers were used, all being equally successful. The best results were obtained when the filler material was granular, at least, in size. With the heavier materials, the blocks or structural components were molded to size. With the lighter materials, sawdust, volcanic ash and lava, the material could be poured or placed into larger molds and then cut to size by metal or abrasive saws.

With further reference to Examples I, II and IV above, various weak polybasic acids were tried within the elements of the proportions set forth in Example I. Of the acids actually used, the following listed acids proved successful: citric, diglycollic, maleic, succinic, sebacic, and tartaric. The degree of success was found to be based on the solubility of the acid in the aniline portion of the composition at ambient temperatures. Under the required condition of use, this criteria is of considerable importance.

*Example V*

In an actual beach landing operation, the chemicals were first reduced to liquid states prior to shipment to the point of use. The chemicals were prepared as follows:

Solution A comprised 9900 lbs. of aniline oil, 2200 lbs. of m-phenylenediamine dissolved in the aniline, 2000 lbs. of citric acid dissolved in the aniline oil, and 2200 lbs. of denatured alcohol. This solution was packaged in 38 fifty-five gallon drums.

Solution F comprised 6185 lbs. of furfural and 40 lbs. of a non-ionic wetting agent and was packaged in 13 fifty-five gallon drums.

The denatured alcohol was used to aid in the dissolution of the citric acid, to maintain the continued solutions of the chemicals in transport, and to insure the complete reaction of the chemicals during the final period of the resinification. The non-ionic wetting agent, which may be one of several commercially available, is added to promote the bond between the resinous chemical binder and the beach sand.

When used in the Roadmixer as previously described, this quantity of chemicals was sufficient to surface a roadway 600 feet long; 12 feet wide, and 6 inches deep. This roadway hardened sufficiently in twenty minutes (20 min.) to support military traffic.

While the preferred use of our resinous chemical binder is as has been described above where the chemicals and aggregate materials have been mixed in a pugmill, it is entirely possible, with proper machinery and methods, to surface a roadway with the aggregate in situ. Under such circumstances, it would probably be necessary to increase the quantity of the liquid chemicals for a given area of roadway to insure complete wetting of the surface aggregate as well as to compensate for seepage below the preferred six-inch level. The solution of the polyfunctional amine in aniline may be added to the aggregate in situ simultaneously with, before, or after the furfural is added. The acid catalyst may be added separately to the roadway aggregate or may be used, as described, in solution with the polyamine in aniline or alternatively may be in solution with the furfural.

This method of rapid resin formation, which is dependent upon the addition of polyfunctional amines and weak acid catalysts to an aniline-furfural composition, produces a strong, quick setting resinous binder for use with a proper aggregate in the construction of roads and other structural components. The materials used require no heating and may be used under wide variations of ambient temperatures.

Obviously, many modifications and variations of the present invention are possible in the light of the above teachings. However, such modifications and variations are to be considered as falling within the scope of the appended claims, wherein we claim:

1. A roadway surfacing composition comprising about 300 parts by weight of an aggregate intimately mixed with a liquid resinous condensation product of a series of complex azomethines formed by adding a mixture of about 6 to 10 parts by weight of aniline, about 0.5 to 4 parts by weight of m-phenylenediamine and about 4 to 7 parts by weight of furfural to about 2 to 5 parts by weight of an aniline soluble polybasic organic acid selected from the group consisting of citric, diglycollic, succinic, sebacic, and tartaric acids.

2. A roadway surfacing composition comprising about 300 parts by weight of an aggregate intimately mixed with a liquid cementitious resinous binder formed by dissolving 6 to 10 parts by weight of aniline, .5 to 4 parts by weight of m-phenylenediamine, and 2 to 5 parts by weight of aniline-soluble polybasic organic acid selected from the group consisting of citric, diglycollic, succinic, sebacic, and tartaric acids in two to three parts by weight of a lower molecular weight alcohol selected from the group consisting of methanol, denatured ethanol and isopropyl alcohols and then adding 4 to 7 parts by weight of furfural combined with .04 to 0.1 parts by weight of a non-ionic wetting agent.

3. The process of making a roadway surfacing composition which comprises thoroughly mixing about 300 parts by weight of an aggregate, about 6 to 10 parts by weight of aniline, approximately .5 to 4 parts by weight of a phenylenediamine, about 2 to 5 parts by weight of an aniline-soluble polybasic acid selected from the group consisting of citric, diglycollic, succinic, sebacic, and tartaric acids, about 4 to 7 parts by weight of furfural, laying and compacting said composition in the form of a roadway and permitting the composition to rapidly solidify in place.

4. A self-curing liquid cementitious resinous binder for forming structural components from about 300 parts by weight of an aggregate comprising 6 to 10 parts by weight of aniline, 0.5 to 4 parts by weight of m-phenylenediamine, 2 to 5 parts by weight of an aniline soluble polybasic organic acid selected from the group consisting of citric, diglycollic, succinic, sebacic, and tartaric acids and 4 to 7 parts by weight of furfural.

References Cited in the file of this patent

UNITED STATES PATENTS

| | | |
|---|---|---|
| 2,272,875 | Kistler | Feb. 10, 1942 |
| 2,272,877 | Kistler | Feb. 10, 1942 |
| 2,314,181 | Winterkorn | Mar. 16, 1943 |
| 2,892,811 | Irany | June 30, 1959 |